R. S. WOOLDRIDGE.
TIPPING MEANS FOR MOTOR VEHICLES.
APPLICATION FILED OCT. 19, 1920.
1,413,309.
Patented Apr. 18, 1922.
4 SHEETS—SHEET 1.
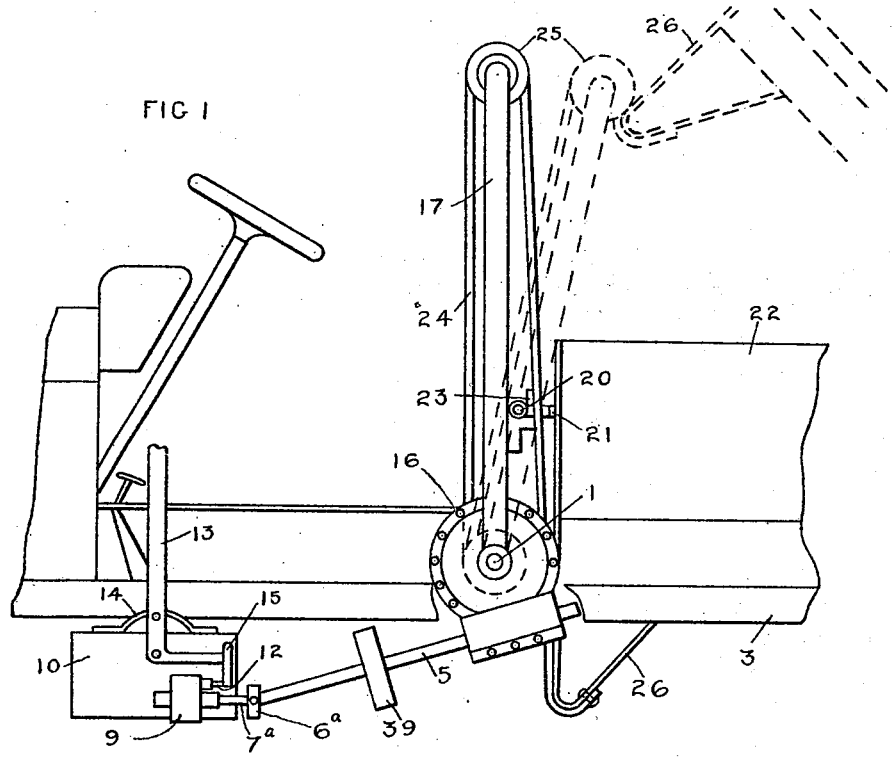
FIG 1
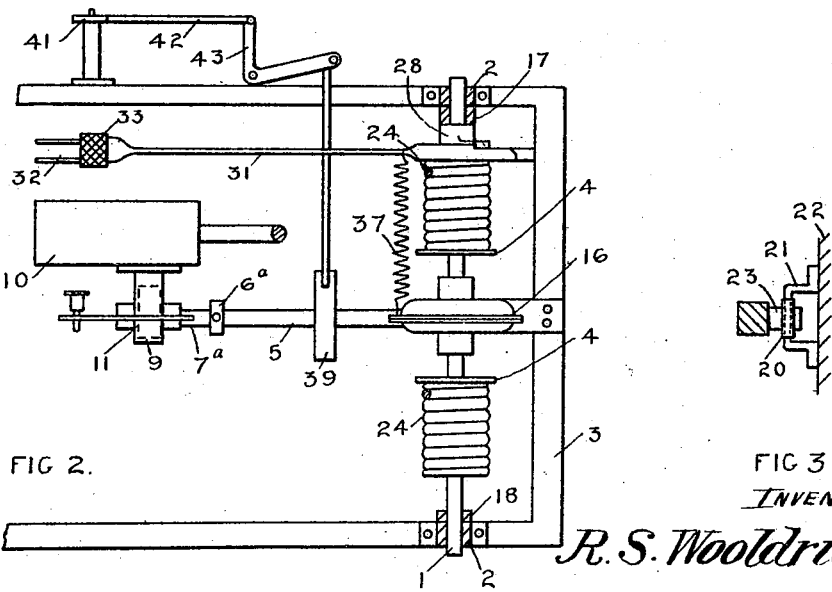
FIG 2.
FIG 3.
INVENTOR.
R. S. Wooldridge.
By William C. Linton
Atty.

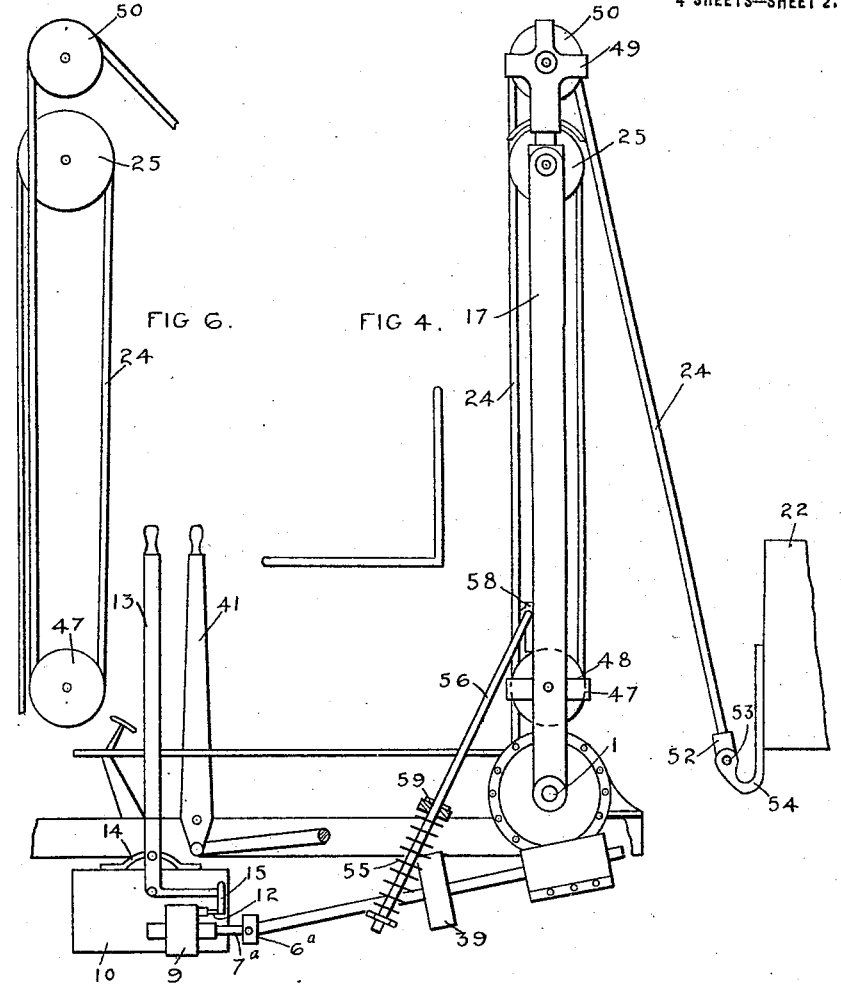
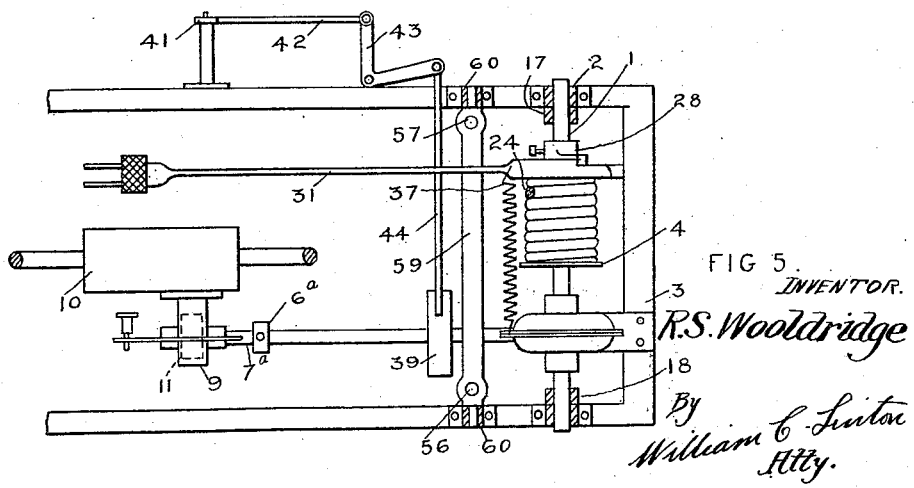

R. S. WOOLDRIDGE.
TIPPING MEANS FOR MOTOR VEHICLES.
APPLICATION FILED OCT. 19, 1920.
1,413,309.
Patented Apr. 18, 1922.
4 SHEETS—SHEET 3.
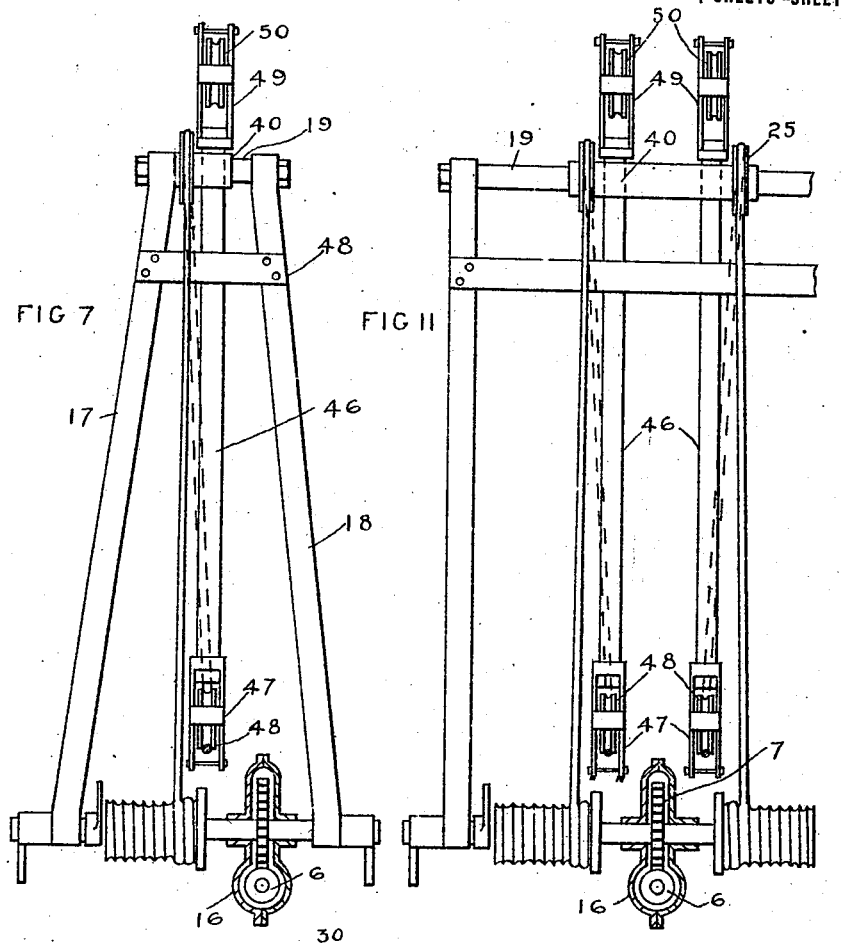
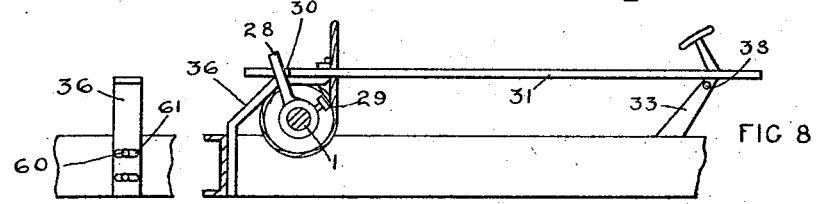
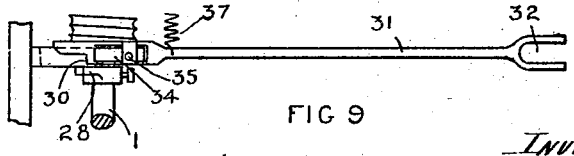
INVENTOR.
R. S. Wooldridge.
By William C. Linton
Atty.

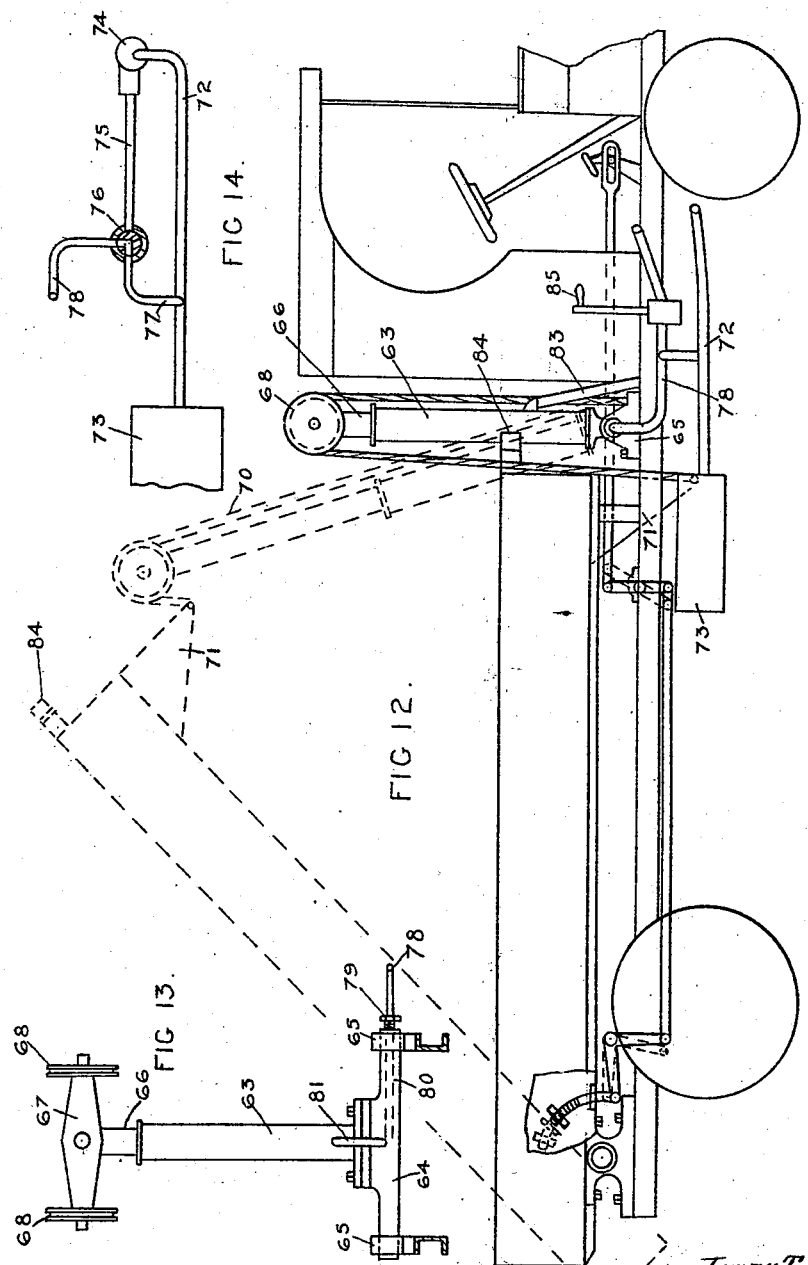

UNITED STATES PATENT OFFICE.

ROBERT STANLEY WOOLDRIDGE, OF NEW PLYMOUTH, TARANAKI, NEW ZEALAND.

TIPPING MEANS FOR MOTOR VEHICLES.

1,413,309. Specification of Letters Patent. Patented Apr. 18, 1922.

Application filed October 19, 1920. Serial No. 418,069.

*To all whom it may concern:*

Be it known that I, ROBERT STANLEY WOOLDRIDGE, a subject of the King of Great Britain and Ireland, residing at New Plymouth, in the Provincial District of Taranaki, Dominion of New Zealand, have invented certain new and useful Improvements in Tipping Means for Motor Vehicles, of which the following is a specification.

This invention relates to hoists for tipping the body of a motor vehicle of the class in which the power from the motor or engine is utilized to operate the hoists and in which wire ropes pass over sheaves upon the upper part of the hoist and are attached to the body of the vehicle.

The object of the present invention is to provide a simple and efficient mechanism which will distribute the weight of the body evenly upon the chassis of a motor truck during the tipping operation. A further object is to automatically cut off the power to the tipping mechanism when the body has reached a pre-determined position.

According to this invention a transverse shaft is arranged in bearings upon the chassis of the vehicle and upon this shaft the hoist is pivoted or arranged in such a manner that it will incline towards the body as the body is tipped. Means are also provided to cut off power when the body is tipped to the required angle, the operation of tipping and lowering being controlled by the operator without leaving his seat. Means are also provided in order that the body may be held in any immediate position and lowered without shock to the vehicle.

The invention is illustrated in the accompanying drawings, wherein:—

Figure 1, is a side elevation.
Figure 2, is a plan.
Figure 3, is a plan of a detail.
Figure 4, is a side elevation.
Figure 5, is a plan, and
Figure 6, is a diagrammatic view showing the arrangement of the sheaves, and
Figure 7, is a front elevation of an alternate form of hoist.
Figure 8, is a side view, and
Figure 9, is a plan of the cut out mechanism.
Figure 10, is an end view of a bracket.
Figure 11, is an elevation of a hoist in which two rope drums and ropes are employed.
Figure 12, is a side elevation of a truck fitted with a hydraulic hoist.
Figure 13, is a front view of the hoist.
Figure 14, is a diagrammatic view of the pipe connections.

Referring first to Figures 1 to 3, a horizontal transverse shaft 1 is journaled in bearings 2 fixed to the chassis 3 and has fixed upon it rope drums 4. The shaft 1 is driven from the vehicle engine through the medium of a shaft 5 having a worm 6 (see Figures 7 to 11) fixed thereon, gearing with a worm wheel 7 fixed upon the shaft 1. The shaft 5 is connected by a universal joint 6 to a stub shaft 7ᵃ journaled in a supplementary gear box 9 attached to the main gear box 10. The stub shaft 7ᵃ has a gear 11 slideable thereon and located within the gear box 9. The pinion 11 gears with the reverse pinion in the gear box and is put into gear therewith by means of a rod 12 guided in the gear box 9 and operated preferably by a hand lever 13 pivoted in a bracket 14 fixed upon the gear box 10. The lower end of the lever 13 is connected to the rod 12 by a link 15. The worm 6 and worm wheel 7 are enclosed in a suitable housing 16. Upright members 17 and 18 are pivoted on the shaft 1 (see Figures 7 and 10) and rigidly connected together at their upper end by a cross member 19.

The members 17 and 18 are normally retained vertical by rollers 20 located upon brackets 21 upon the front end of the truck 22 (see Figure 3), and are adapted to engage behind brackets 23 upon each of the vertical members.

Upon each drum 4 a wire rope 24 is coiled and fixed at one end thereon and the ropes pass upwardly and over sheaves 25 and then lead downwardly and are attached to brackets 26 upon the underside of the truck body at the front end thereof as shown.

An automatic cut out device is provided (see Figures 8 and 9) and comes into operation when the body is lifted the desired height, and consists of an arm 28 fixed to the shaft 1 by a set screw 29. The arm engages a shoulder 30 in the end of the rod 31 which has a slot 32 engaging around the clutch pedal 33. The rod 31 has a slot 34 through which passes a bolt 35 from a bracket 36. The slot 34 allows the rod 31 to have both forward and lateral movement, and is held out of engagement by the use of a spring 37. The rod 31 is held up by a pin 38 in the pedal. The bracket 36 is secured by bolts 60 projecting from a cross member of the chassis 3 (see Figure 10) and passing through slots 61 in order to enable the bracket to be adjusted.

The operation is as follows:—

The rope drums are put into operation by the hand lever 13 and the ropes 24 will be hauled over the sheaves 25 thereby raising the body, the hoist inclining towards the body during the operation as shown in dotted lines in Figure 1. When the body has been tipped sufficiently, by which time the ropes will have coiled upon the drums 4, one of which will push the rod 31 into engagement with the arm 28, which in turn will push the rod 31 forward and operate the clutch pedal 32, thereby cutting off power to the drum.

The body may be lowered or held at any intermediate position by means of a band brake drum 39 located upon the shaft 5 and such brake is operated by a lever 41 through the medium of a link 42 and bell crank 43, the latter being connected to the brake band by a link 44.

In Figures 4 to 11, a movable shaft 46 is journalled in a guide 40 in the cross member 19 and in a guide 48' fixed to the members 17 and 18 below the cross member 19. The lower end of the shaft 46 has a sheave block 47 pivoted upon it and having a sheave 48 pivoted therein. The upper end of the shaft has a sheave block 49 pivoted thereon and a sheave 50 pivoted on the block. One rope and one rope drum are employed in Figures 4 to 7 and two ropes are shown employed in Figure 11. The ropes pass upwardly and over the sheave 25. The rope then passes downwardly and around the sheave 47 and upwardly around the sheave 50 and is connected by a shackle 52 (see Figure 4) and bolt 53 to a bracket 54 fixed to the front of the body 22, so that the rope may be easily detached from the body. The sheaves 48 and 50 being pivoted to the shaft 46 they will align with the rope.

In Figures 4 to 7, the members 17 and 18 are normally retained vertical by coil springs 55, located with the rods 56 and 57, each rod being pivoted in a bracket 58 fixed to each of the members 17 and 18. The rods 56 and 57 pass through holes in a transverse member 59 pivoted in bearings 60 fixed upon the chassis 3. The springs are in compression between the members 59 and nuts upon the ends of the rods.

The operation is as follows:—

The rope drum is put into operation by the hand lever 13 and the rope 24 will be hauled over its sheaves thereby raising the body, the hoist inclining towards the body during the operation. When the shackle 52 reaches the block 49 the portion of rope between the sheaves 48 and 50 will tend to shorten thereby raising the shaft 46 until the body has been tipped sufficiently by which time the rope will have coiled upon the drum 4 and reached the rod 31 which it will push into engagement with the arm 28, which in turn will push the rod 31 forward and operate the clutch pedal 33, thereby cutting off power to the drum.

Referring now to Figures 12 to 14, the hoist consists of a hydraulic cylinder 63 mounted upon a shaft 64 journalled in bearings 65 fixed to the chassis. The plunger rod 66 has a cross member 67 upon its upper end and sheaves 68 mounted thereon. Ropes 70 fixed at their lower ends to a convenient portion of the chassis pass over the sheaves and are attached to brackets 71 upon the forward end of the body. A pipe 72 leads from a tank 73 for containing the water and then leads to a pump 74, while a pipe 75 leads from the pump to a three-way cock 76. Another pipe 77 leads from the three-way cock 76 to the pipe 72. Another pipe 78 leads from the three-way cock to a gland 79 of any known construction located in the end of the shaft 64 so that the shaft can rotate without the pipe 78 rotating. A passage 80 through the shaft from the gland communicates with the cylinder by a pipe 81. Stops 83 prevent the cylinder from moving forward out of the upright position, and a bracket 84 upon the short end of the body retains the cylinder against the stops 83.

When it is desired to tip the body, the pump 74 is operated from the engine of the vehicle and draws the water through the pipe 72 and forces it through the three-way cock into the pipe 78 and thence through the shaft 64 into the cylinder 63. As the body rises the cylinder will incline towards the body as shown in dotted lines in Figure 12.

When it is desired to lower the body the three-way cock is turned to the position shown in Figure 14 and the weight of the body upon the plunger will cause the water to flow through the pipe 78, three-way cock 76, pipe 77, and pipe 72 and thence into the tank 73, the flow being controlled by the handle 85 of the three-way cock, so that the body may be lowered at the desired speed.

As the body is being lowered, the bracket 84 upon the front end of the body will return the cylinder to its vertical position as shown in Figure 12.

Either water or oil may be employed as the pressure medium.

Claims:

1. In a device of the character described the combination with a movable body of a motor vehicle, of a transversal shaft journalled upon the chassis of said vehicle, a vertically disposed hoist having its lower end pivotally secured to said shaft, rope drums carried by said body, an arm carried by said shaft, a rod connected to the clutch pedal of the vehicle and adapted for engagement with said rope whereby when said body reaches a predetermined position said rod is pushed into engagement with said arm for disengaging the clutch substantially as and for the purpose specified.

2. In a device of the kind described, a transverse driven shaft, upright members pivoted at their lower ends upon said shaft, a rope drum upon said shaft, a movable shaft guided in said upright members, sheaves on the upper and lower ends of said movable shaft, a rope from the drum passing over said sheaves, and a sheave on said upright member over which said rope first passes, substantially as described.

3. In a device for tipping the body of a motor vehicle, a driven rope drum, upwardly disposed members pivoted at their lower ends in order to permit them to incline towards the body as the body is being tipped, sheaves upon the said members, a rope from said rope drum passing over said sheaves, a movable shaft guided in said upwardly disposed members and permitted to extend beyond said members, sheaves upon the upper and lower ends of said shaft, said rope from the rope drum passing around said sheaves upon said shaft in such a way that after the body has been tipped to the limit of the members, such rope will operate to raise the movable shaft to permit the body to be raised still further, substantially as described.

4. In a device of the kind described, a transverse driven shaft, upright members pivoted at their lower end upon said shaft, rope drums upon said shaft, movable shafts guided in said upright members, sheaves on the upper and lower ends of said shafts, a rope from said drums passing over said sheaves, a sheave on said upright members over which said rope first passes and means to return the upright members to their normal position, substantially as described.

5. In a device of the kind described, a transverse driven shaft, upright members pivoted at their lower ends upon said shaft, a rope drum upon said shaft, a movable shaft guided in said upright members, sheaves on the upper and lower ends of the shaft, a rope from said drum passing over said sheaves, a sheave on said upright member over which said rope first passes, and means whereby the rope upon the rope drum will cause a member to operate the clutch pedal when the body is tipped to the required height, substantially as described.

6. In a device of the kind described, an arm upon the rope drum shaft, a rod having a shoulder thereon, a spring to retain the rod normally clear of the arm, and means whereby the rope will cause the rod to be engaged by the arm when the rope has coiled to a pre-determined position upon the drum thereby causing the rod to operate the clutch pedal, substantially as described.

In testimony whereof I have affixed my signature in the presence of the two subscribing witnesses.

ROBERT STANLEY WOOLDRIDGE.

Witnesses:
KEITH E. BELL,
T. M. ELLIS.